UNITED STATES PATENT OFFICE.

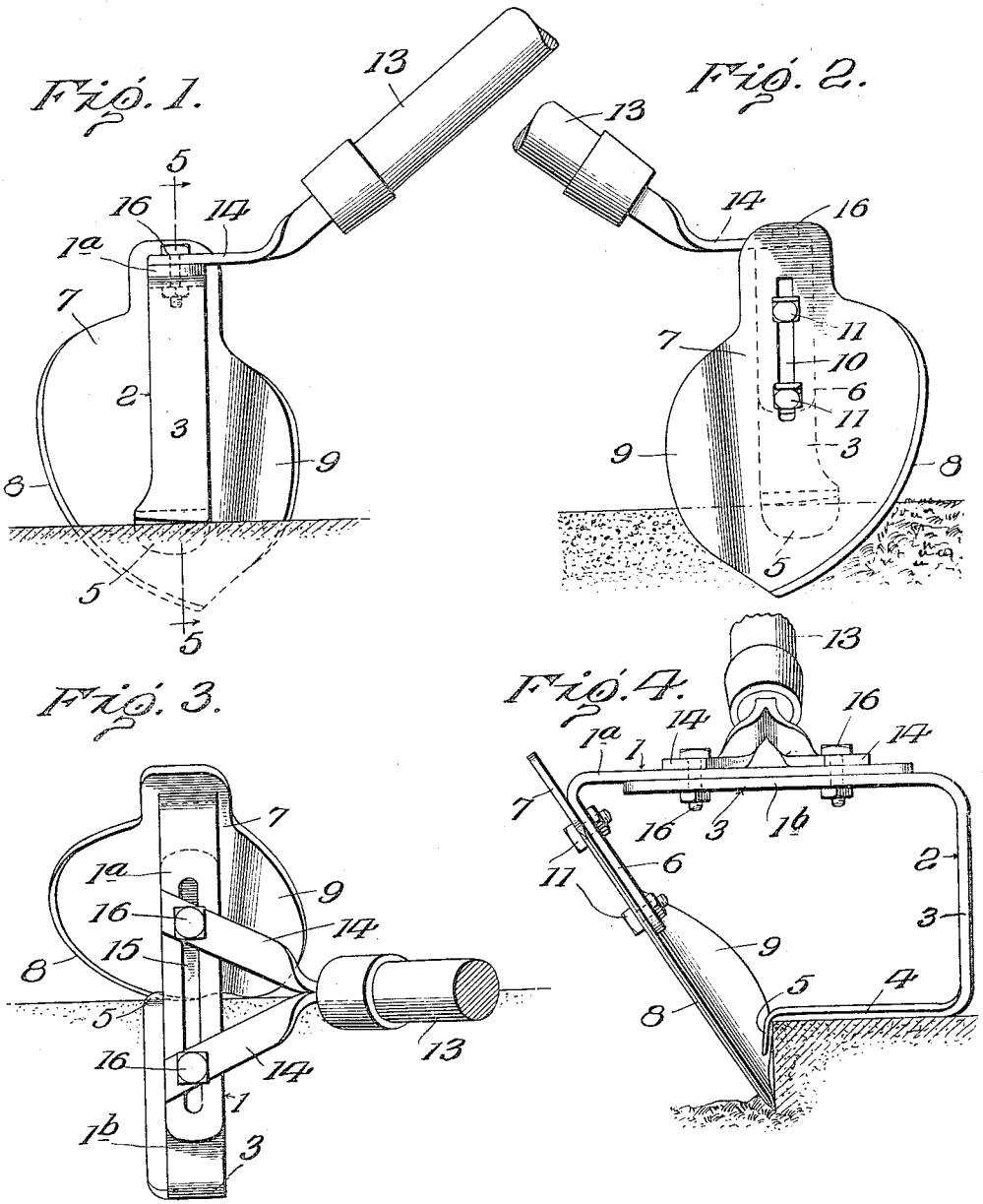

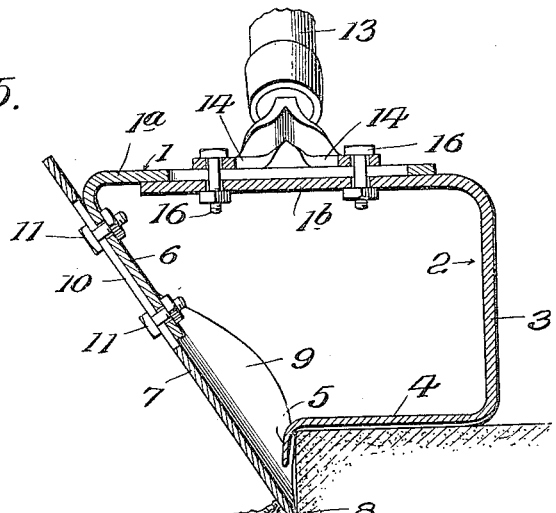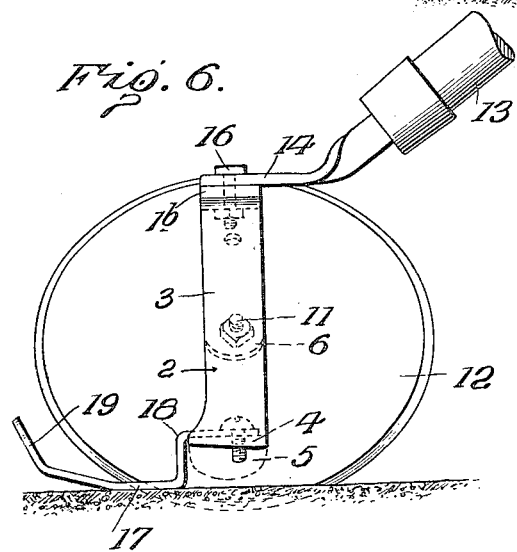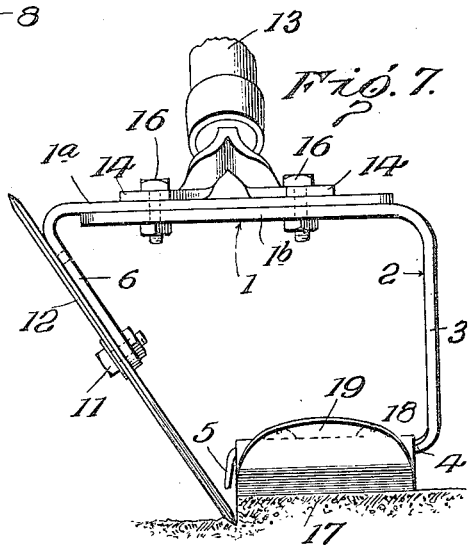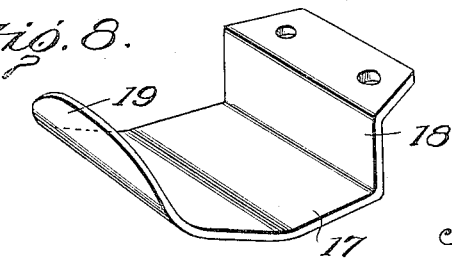

JOHN ANDERSON, OF SARATOGA SPRINGS, NEW YORK.

EDGE-TRIMMER.

1,140,233.  Specification of Letters Patent.  Patented May 18, 1915.

Application filed March 8, 1915. Serial No. 12,958.

*To all whom it may concern:*

Be it known that I, JOHN ANDERSON, a citizen of the United States, residing at Saratoga Springs, in the county of Saratoga and State of New York, have invented certain new and useful Improvements in Edge-Trimmers; and I do declare the following to be a full, clear, and exact description of the invention, such as will enable others skilled in the art to which it appertains to make and use the same.

My invention relates to improvements in edge trimmers and has for its object to provide a device of this class which may be very easily and inexpensively manufactured, which when applied to use will be very efficient in operation, and which may be used in trimming the sod along practically any style of walk.

With this general object in view, the invention resides in certain novel features of construction and combination hereinafter described and claimed.

In describing the invention, I shall refer to the accompanying drawings wherein like reference characters designate corresponding parts throughout the various views, and wherein:

Figure 1 is a side view of the invention showing the arrangement of parts for trimming the sod along a cement walk; Fig. 2 is a similar view of the other side of the tool; Fig. 3 is a top plan view; Fig. 4 is a front end view; Fig. 5 is a vertical transverse section as seen along the plane indicated by the line 5—5 of Fig. 1; Fig. 6 is a view similar to Fig. 1 showing the arrangement of parts for trimming the sod along walks constructed of gravel or the like; Fig. 7 is a front end view with the parts of the tool arranged as disclosed in Fig. 6, and Fig. 8 is a perspective view of the supplemental supporting shoe to be described.

In these drawings, constituting a part of the application, 1 designates the longitudinally extensible and contractible main arm of a head or bracket. From one end of this arm a substantially right-angular arm 2 projects laterally, one half 3 of the arm 2 being united with the aforesaid end of the arm 1, while the other half 4 of said arm 2 is disposed in substantially parallel relation to said arm 1 to provide a supporting shoe. The free end of the half 4, or the shoe as it may well be termed, is bent laterally away from the arm 1, thus providing a guide flange 5 whose front edge as well as the front edge of the shoe 4, is preferably sharpened. Projecting laterally from the other end of the main arm 1, is an inclined arm 6 which extends toward the guide flange 5, this arm being provided for the attachment of an appropriate type of cutting blade which may be of the form shown in Figs. 1 to 5, or of the style disclosed in Figs. 6 and 7. If the blade 7 shown in Figs. 1 to 5 be used, said blade is provided with a curved front cutting edge 8 and with a laterally extended mold board 9 at its rear edge, said mold board being curved laterally toward the half 3 of the arm 2, this being expedient for a purpose to be hereinafter explained. The body portion of the blade 7 is provided with a longitudinally extending adjusting slot 10 through which and through openings in the inclined arm 6, adjusting bolts 11 are passed, whereby tightening of said bolts will draw the blade 7 into contact with the arm 6, while loosening thereof will allow said blade to be adjusted to move its lower end toward or away from the flange 5, as the case may be. On the other hand, if the rotatable disk 12 shown in Figs. 6 and 7 be used, but one bolt is necessary for connecting the same with the inclined arm 6 in such a manner as to allow it to rotate as the tool is forced forwardly.

Preferably, though not necessarily, I employ the blade 7 when the tool is being used for trimming sod along the edges of a cement walk, during which operation the shoe 4 travels upon the upper edge portion of said walk, while the flange 5 abuts the outer edge thereof to guide the forward movement of the tool, it being understood that the tool is forced forwardly by hand, through the instrumentality of an appropriate operating handle 13.

In the present embodiment, the handle 13 is shown as provided with a pair of forwardly diverging arms 14 which overlie the arm 1, and the latter is illustrated as being constructed of an upper section 1ᵃ from which the arm 6 projects laterally, and a lower section 1ᵇ from which the right-angular arm 2 extends, one of these sections being slotted longitudinally as seen at 15 for the reception of clamping bolts 16 which pass through the slot, through the front ends of the arms 14, and through the other section. By this detail of construction, it will be evident that the same bolts serve not only as means for varying the length of the arm 1, but as means for attaching the operating handle 13 to the bracket.

In using the tool for trimming sod along the edges of walks constructed of sand, gravel, or the like, the cutting disk 12 is preferably used and, in order to raise the flange 5 to an extent great enough to prevent it from cutting into the walk, a supplemental supporting shoe 17 (see Figs. 6, 7 and 8) is used, this shoe having an upwardly offset rear end 18 which is bolted or otherwise secured to the shoe 4, while its front end is curved upwardly as seen at 19, thus facilitating its passage over the walk, during which movement the disk 12 effectively trims the sod bordering the edges of said walk. In this form of the device, however, the sod cut by the tool is not delivered upon the walk, whereas when using the blade 7, the mold board 9 deflects such sod laterally and deposits it upon the walk, whereupon it may be readily removed.

From the foregoing description, taken in connection with the accompanying drawings, it will be evident that although a very simply constructed and inexpensive tool has been provided for carrying out the object of the invention, the same will be very efficient in operation and will possess a number of advantageous features. Considerable emphasis is laid upon the provision of the extensible and contractible arm 1, since by the provision thereof, the distance between the flange 5 and the cutting blade may be varied, thus varying the width of the channels formed along the edges of the walk.

In the foregoing description, I have described certain specific formations for reducing the invention to an operative device, and in the drawings have shown such details, but it will be evident that I need not be limited thereto otherwise than as specified in the following which—

I claim as my invention:

1. In an edge trimmer, a bracket comprising a main arm, a substantially right-angular arm projecting laterally from one end thereof and having one of its halves disposed substantially parallel to said main arm, a guide flange projecting laterally from the free end of the aforesaid half of the right-angular arm and extending away from the main arm, a cutting blade projecting laterally from the other end of the main arm to a point adjacent the aforesaid guide flange, and a handle secured to the bracket.

2. In an edge trimmer, a bracket comprising a main arm, a substantially right-angular arm projecting laterally from one end thereof and having one of its halves disposed substantially parallel to said main arm, a guide flange projecting laterally from the free end of the aforesaid half of the right-angular arm and extending away from the main arm, an inclined arm projecting laterally from the other end of the main arm toward the guide flange, an inclined cutting blade carried by said inclined arm and terminating adjacent said guide flange, and an operating handle secured to the bracket.

3. In an edge trimmer, a bracket comprising a main arm, a substantially right-angular arm projecting laterally from one end thereof and having one of its halves disposed substantially parallel to said main arm, a guide flange projecting laterally from the free end of the aforesaid half of the right-angular arm and extending away from the main arm, an inclined arm projecting laterally from the other end of the main arm toward the guide flange, an inclined cutting blade contacting with said inclined arm and terminating adjacent said flange, said blade having an adjusting slot, an adjusting bolt passing therethrough and through the inclined arm, and an operating handle secured to the bracket.

4. In an edge trimmer, a bracket comprising a main longitudinally extensible and contractible arm, a supporting shoe carried by one end of said arm, a cutting blade carried by the other end thereof and terminating adjacent the shoe, and an operating handle secured to the bracket.

5. In an edge trimmer, a bracket comprising a main extensible and contractible arm formed of a pair of overlapped arm sections adjustably secured together, a substantially right-angular arm projecting laterally from one end of the main arm and having one of its halves lying substantially parallel to said main arm, an inclined arm projecting laterally from the other end of the main arm toward the aforesaid half of the right-angular arm, a cutting blade carried by said inclined arm and terminating adjacent the free end of said half of the right-angular arm, and an operating handle secured to the bracket.

6. In an edge trimmer, a bracket comprising a main arm, a substantially right-angular arm projecting laterally from one end thereof and having one of its halves disposed in parallel relation to the main arm, an inclined arm projecting laterally from the other end of the main arm toward the aforesaid half of the right-angular arm, a cutting blade carried by the inclined arm and terminating adjacent the free end of said half of the right-angular arm, and an operating handle secured to the bracket.

7. The combination with an edge trimmer including a supporting shoe, a cutting blade terminating adjacent the same, and a handle; of a supplemental shoe having one end offset and detachably secured to the aforesaid shoe, the other end of the supplemental shoe being curved upwardly.

In testimony whereof I have hereunto set my hand in presence of two subscribing witnesses.

JOHN ANDERSON.

Witnesses:
JAS. M. DUNLAVEY,
JOHN T. SWEENY.